United States Patent [19]

Noordenbos

[11] Patent Number: 4,770,954

[45] Date of Patent: Sep. 13, 1988

[54] SWITCHING POWER SUPPLY AND METHOD

[75] Inventor: Andre M. Noordenbos, Santpoort, Netherlands

[73] Assignee: Halliburton Company, Duncan, Okla.

[21] Appl. No.: 109,354

[22] Filed: Oct. 16, 1987

[51] Int. Cl.$^4$ .................. H01M 12/00; H01M 10/44
[52] U.S. Cl. ........................................ 429/9; 429/50; 429/62; 429/67; 320/30; 320/53
[58] Field of Search .................. 429/9, 50, 62, 97; 320/70, 53

[56] References Cited

U.S. PATENT DOCUMENTS

| | | | |
|---|---|---|---|
| 2,058,755 | 10/1936 | Arnesen | 429/47 |
| 2,616,937 | 11/1952 | Kullgra | 429/9 X |
| 2,913,587 | 11/1959 | Gebhard | 429/97 X |
| 3,909,685 | 9/1975 | Baker et al. | 307/151 X |
| 4,050,743 | 9/1977 | Knight | 303/40 X |
| 4,422,031 | 12/1983 | Vigerstol | 320/53 X |

Primary Examiner—Brian E. Hearn
Assistant Examiner—Stephen J. Kalafut
Attorney, Agent, or Firm—James R. Duzan; E. Harrison Gilbert, III

[57] ABSTRACT

A power supply has two energy sources, one of which has a relatively low energy density but provides a relatively high current and the other of which has a relatively high energy density but provides a relatively low current. One end of each of the energy sources is connected to an output terminal through a respective diode. The other ends of the energy sources are connected together to another output terminal. The power supply operates so that when the relatively low current is required by a load connected across the output terminals, the high energy density source provides the current; but when the relatively high current is required by the load, the current is provided from the low energy density source.

18 Claims, 1 Drawing Sheet

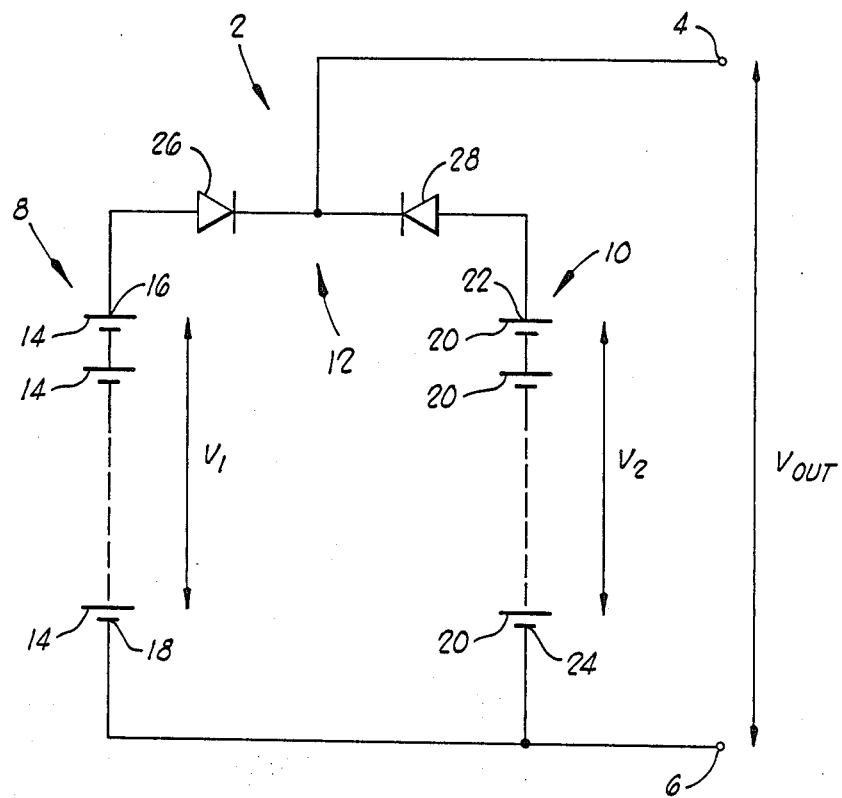

SWITCHING POWER SUPPLY AND METHOD

BACKGROUND OF THE INVENTION

This invention relates generally to power supplies and methods and more particularly, but not by way of limitation, to a battery pack having switchable sets of batteries for powering a downhole tool during different time periods during which different currents are required so that the tool is operable for a longer overall time.

In the oil and gas industry downhole electronic equipment for recording pressure, temperature or other well data is usually powered by batteries contained in the equipment to be lowered into a well bore. One type of battery known to have been used in such an environment is a zinc silver oxide battery, or groups of these batteries, which can supply both relatively high and low currents within an operating temperature range between approximately 15.6° C./60° F. and approximately 170° C./338° F. Another known type of battery is a lithium based battery which has heretofore had somewhat limited, if any, utility in such an environment because this type of battery cannot provide relatively high currents which are sometimes needed by the downhole electronic equipment. The lithium based battery is also primarily an elevated temperature (e.g., above approximately 100° C./212° F.) battery so that this type might inadequately provide the relatively low currents at lower temperatures which might be encounted, such as an ambient surface temperature at the mouth of the well or other relatively low temperature at locations in the upper hole.

The lithium type battery does, however, have one particularly desirable characteristic, namely, an energy density which is significantly greater than the energy density of the zinc silver oxide type battery. For example, the energy density of a zinc silver oxide battery might be only 50% to 70% of the energy density of a lithium battery. That is, lithium batteries contain more electrical energy than comparable zinc silver oxide batteries; however, the former are useful only at relatively low currents and generally at relatively elevated temperatures. This means that, in a suitable low current drawing, high temperature environment, a lithium battery would have a longer operating life than a comparable zinc silver oxide battery under similar continuous operating conditions.

The foregoing differences in types of batteries which might be used in downhole electronic equipment are significant because such equipment generally has different current requirements during different periods of operation of the equipment. For example, a downhole electronic recorder that stores data in EPROM memory might require three different currents. For the EMR 502/504 memory gauge from Geophysical Research Corporation (GRC), the three currents required are typically 200 milliamps (mA) for 7.1 seconds to sample data, typically 500 mA for 0.1 second to store data, and typically 20 mA for up to several minutes to wait until the next data sample time. In a typical run while being powered exclusively by zinc silver oxide batteries, this tool might operate for 120 to 150 hours and record 2000 to 4000 pressure or temperature samples. A majority of the energy expended from the zinc silver oxide batteries in operating this tool would be expended at the low standby current of typically 20 mA while waiting between samples. This could be more efficiently operated by the higher energy density lithium type battery than the relatively lower energy density zinc silver oxide type battery; however, the lithium type battery cannot provide the relatively high currents needed to sample and store the data.

To more efficiently operate such equipment and thereby to extend the operating time of such equipment, there is the need for an improved power supply, and related method, which provide relatively high currents when needed, but which use a more efficient or higher energy density source to provide the relatively lower currents which are more often required. Such a power supply and method should result in increased run times for the electronic equipment, or load, energized by such power supply and method. It would also be desirable for such an improved power supply and method to be less expensive than other types which may have heretofore been used. It would also be desirable if such an improved power supply and method could produce a space saving, which is important when such a power supply and method would be used with a downhole electronic equipment which of necessity has limited space so that it will fit into the well bore.

SUMMARY OF THE INVENTION

The present invention meets the aforementioned needs by providing a novel and improved power supply and method which in their preferred embodiment are specifically contemplated to be adapted for use with downhole electronic equipment, such as a downhole memory recorder. The present invention utilizes at least two different energy sources to provide different currents in response to the current which needs to be drawn by the load. As a result of this construction or implementation, increased run times and cost savings can be achieved. It is also contemplated that such an improved power supply can be more compactly packaged to save space relative to other types of power supplies which may have been used in similar environments.

The power supply of the present invention comprises first energy source means, having a first energy density, for providing a first current; second energy source means, having a second energy density greater than the first energy density, for providing a second current less than the first current; and connector means for conducting the second current to a connected load when the load does not require a current greater than the second current and for conducting the first current to a connected load when the load does require a current greater than the second current. Such a power supply can be used to effect a method of energizing a load requiring one current during one time period and requiring another current during another time period, which one current is greater than the other current. This method comprises the steps of communicating to the load during the one time period the first energy source having the first energy density, and communicating to the load during the other time period the second energy source having the second energy density greater than the first energy density.

Therefore, from the foregoing, it is a general object of the present invention to provide a novel and improved power supply and method. Other and further objects, features and advantages of the present invention will be readily apparent to those skilled in the art when the following description of the preferred embodiment is read in conjunction with the accompanying drawing.

BRIEF DESCRIPTION OF THE DRAWING

The drawing is a schematic circuit diagram of a power supply constructed in accordance with the preferred embodiment of the present invention.

DETAILED DESCRIPTION OF THE PREFERRED EMBODIMENT

The drawing shows a power supply 2 constructed in accordance with the preferred embodiment of the present invention. The power supply 2 is specifically adapted for use as a power pack for enabling longer operating times of an electrical load, such as a downhole memory recorder which is to be used downhole in a well bore and to be energized by at least a minimum operating voltage and which is to draw different currents at different stages of operation. This load is connected across two output terminals 4, 6 so that an output voltage, $V_{OUT}$, generated by the power supply 2 is applied to the load.

The power supply 2 of the preferred embodiment includes two energy source means 8, 10, each having a respective energy density with one of the energy densities being greater than the energy density of the other energy source means. The energy source means 8 will be considered to have the lower energy density, and the energy source means 10 will be considered to have the higher energy density in the following description. The lower energy density source 8 provides a maximum current which is greater than can be provided from the higher energy density source 10 in the preferred embodiment.

The power supply 2 also broadly includes connector means 12 for conducting the lesser current from the source 10 to a load connected to the terminals 4, 6 when the load does not require a current greater than such lesser current and for conducting the greater current from the source 8 to the connected load when the load does require a current greater than the lesser current.

The energy source 8, which has the lower energy density but which provides the larger current, includes a plurality of batteries, or battery cells, 14 connected in electrical series between two end terminals or poles 16, 18. In the preferred embodiment each battery 14 is a zinc silver oxide battery which is operable over a temperature range between approximately 15.6° C./60° F. and approximately 170° C./338° F. This range encompasses temperatures above and below a predetermined temperature included within this range. This range of operation is of significance in the preferred embodiment relative to the energy source 10 as will be subsequently described hereinbelow.

The batteries 14 connected in electrical series as shown in the drawing provide a voltage, $V_1$, which is to be greater than the minimum operating voltage at or above which $V_{OUT}$ is to be maintained when the load is connected to the output terminals 4, 6 and operated by the power supply 2. Under either no-load or load conditions, $V_1$ should remain substantially stable regardless of the current to be drawn by the load connected to the output terminals 4, 6. Thus, this voltage should remain substantially stable regardless of whether the energy source 8 is providing current to the connected load when the connected load requires the relatively larger current which the source 8 is capable of providing, or whether the energy source 10 is providing a lower needed current, or whether the energy source 8 is providing such lower current as might be needed when the energy source 10 is unable to provide such lower current in a relatively low temperature environment in which a particular embodiment of the energy source 10 might be inoperable.

The energy source 10, which has the higher energy density but which provides the smaller maximum current in the preferred embodiment, comprises a plurality of batteries, or battery cells, 20 connected in electrical series between two terminals or poles 22, 24. This plurality of batteries is connected in electrical parallel with the serially connected batteries 14 by having the terminals 18, 24 connected by a suitable electrical conductor, which connected terminals are connected to the terminal 6, and by having the terminals 16, 22 connected through the connector means 12 in a manner more specifically described hereinbelow.

In the preferred embodiment the batteries, or battery cells, 20 are lithium based batteries. These can be of the type such that the zinc silver oxide batteries will have energy densities of only approximately 50–70% of the energy densities of the lithium batteries. These lithium based batteries provide current throughout a respective temperature range which in the preferred embodiment is greater than the aforementioned predetermined temperature encompassed within the temperature range throughout which the zinc silver oxide batteries 14 operate. In the preferred embodiment this predetermined temperature is 100° C./212° F.

The serially connected batteries 20 provide a voltage $V_2$. The open circuit magnitude of this voltage $V_2$ is greater than the open circuit value of $V_1$ under open circuit conditions. The voltage $V_2$, however, is variable between such a magnitude greater than the voltage $V_1$ and a magnitude which is less than $V_1$. The variation occurs automatically in response to the current required by the load connected to the terminals 4, 6. More particularly, $V_2$ varies between a magnitude substantially equal to (which includes being exactly equal to) the open circuit value of $V_2$ and a magnitude less than the open circuit value of $V_1$ in response to the different currents drawn by the connected load at the different stages of operation of such load. This difference is important to the operation of the power supply 2 as will be further described hereinbelow; however, it is to be noted here that this difference makes important the ratio between the number of the batteries 14 and the number of the batteries 20 used so that the appropriate resultant voltage difference will be obtained. The particular ratio of these batteries depends upon the respective voltages of each individual battery or cell 14, 20 and what working voltages are needed, as well as upon what components are used in constructing the connector means 12. By way of one example, it could be that the sum voltage of the batteries 14 (i.e., $V_1$) would be 60–80% of the sum voltage of the batteries 20 (i.e., $V_2$). More specifically, if a nominal $V_{OUT}$ of $6V_{DC}$ were needed to operate the load connected to the terminals 4, 6, the batteries 14 might be selected so that the open circuit magnitude of $V_1$ would be approximately $7.5V_{DC}$ and so that the open circuit value of $V_2$ would be approximately 9.0–12.0 $V_{DC}$.

At any one time, either or both of the energy sources 8, 10 can be connected in circuit to the output of the terminals 4, 6 and any load connected to these terminals. This selective connection is made by means of the connector means 12 which, therefore, provides switch means for switchably connecting a respective one of the two pluralities of batteries in circuit with a load connected to the terminals 4, 6. This switchable connection is made in response to the current drawn by the connected load. This switching is achieved in the preferred embodiment by constructing the connector means of two diodes 26, 28, each of which also provides protection to its respective circuit when the other circuit is connected to energize a connected load.

The diodes 26, 28 have cathodes which are connected in common to the terminal 4. It is through this common connection that each diode 26, 28 can connect its respective plurality of batteries to the load connected to the terminal 4. The anode of the diode 26 is connected to the terminal 16 of the energy source 8, and the anode of the diode 28 is connected to the terminal 22 of the energy source 10. In the preferred embodiment the diodes 26, 28 are germanium diodes because they have lower operating voltage drops than silicon diodes; however, the scope of the present invention is not limited to such specific components. It is also to be noted that other arrangements of the components shown in the drawing could be made to adapt the illustrated preferred embodiment to other polarity arrangements.

Under no load conditions (i.e., open circuit conditions with no current flowing), $V_{OUT}$ will be $V_2$ less the voltage drop across the diode 28 because in the preferred embodiment $V_2$ is greater than $V_1$ under open circuit conditions. The voltage differential causes the diode 28 to be biased on and the diode 26 to be biased off. Under low current load operation, wherein a low current within the capacity of the energy source 10 is provided to a load connected across the terminals 4, 6, $V_{OUT}$ again equals $V_2$ less the voltage drop across the diode 28 because $V_2$ still remains greater than $V_1$. This operation holds when the power supply 2 is used in an environment wherein the temperature is within the operating range of the batteries 20 constituting the energy source 10. If the power supply 2 is in a sufficiently low temperature environment and if as a result the voltage $V_2$ drops sufficiently low, then the diode 26 is biased on by the substantially stable $V_1$ so that the diode 26 provides means for conducting a current from the source 8 to the load when the load does not require a current greater than the current which could have been provided from the energy source 10 but for the temperature being below the predetermined temperature at which the energy source 10 is operable.

The voltage $V_2$ also decreases under high current load conditions wherein the load connected across the terminals 4, 6 requires a current greater than can be provided by the energy source 10. This current drain causes the voltage $V_2$ to decrease until it reaches at least a voltage which allows the voltage $V_1$ to forward bias the diode 26 so that the connector means 12 then connects the energy source 8 to the load as well (during normal operation wherein the batteries 20 are not sufficiently depleted, the diode 28 will stay in a conducting state). For this operation, $V_{OUT}$ would equal $V_1$ less the voltage drop across the diode 26. When the current requirement returns to the lower level, the voltage $V_2$ goes up again, thereby causing the diode 26 to switch the energy source 8 off line so that the low current is again conducted to the load from the energy source 10 only. The diode 28 prevents recharging the batteries 20 of the energy source 10 by the batteries 14 of the energy source 8 when the batteries 20 are sufficiently depleted and the batteries 14 are not so that the energy source 8 is connected through the diode 26 in circuit with the load connected to the terminals 4, 6. The point of depletion occurs when the batteries 20 are depleted so badly that the open circuit sum voltage $V_2$ of these batteries is less than the voltage on the connector means 12 ($V_{OUT}$).

The foregoing provides a method of energizing a load requiring one current during one time period and requiring another current during another time period, which one current is greater than the other current. This method comprises the steps of communicating to the load during the one time period a first energy source having a first energy density, and communicating to the load during the other time period a second energy source having a second energy density greater than the first energy density. The first-mentioned communicating step includes defining the first energy source with a first plurality of batteries providing a first voltage, and it further includes connecting a first diode between the first plurality of batteries and the load. The second-mentioned communicating step includes defining the second energy source with a second plurality of batteries providing a second voltage less than the first voltage during the one time period and greater than the first voltage during the other time period, and it further includes connecting a second diode between the second plurality of batteries and the load. In the preferred embodiment the first energy source is defined with a plurality of batteries including zinc silver oxide, and the second energy source is defined with a plurality of batteries including lithium.

The first communicating step can also be said to include switching a first plurality of serially connected batteries through a first diode to the load during the one time period, and the second communicating step can be said to include switching a second plurality of serially connected batteries through a second diode to the load during the other time period.

A test of the above-described embodiment was conducted using five zinc silver oxide batteries (type 4016LF from VARTA) as the energy source 8 combined with three lithium based batteries (type 3B90 from ElectroChem Inc.) as the energy source 10. This combination powered a GRC memory gauge EMR 502/504 for approximately 300 hours. A second test was conducted with five of the same type of zinc silver oxide batteries combined with four lithium batteries (type LCP14HT from SAFT). The memory gauge was run for approximately 342 hours with this combination. In both tests, the batteries were in an oven which was switched on two hours after the start of the tool and then heated to approximately 137° C./278.6° F. and maintained at that temperature until the end of the test. The difference in the numbers of lithium batteries used for both tests resulted from the fact that the open cell voltage of the two types was not the same. These run times are to be compared with the typical 120–150-hour run times obtained when only zinc silver oxide batteries are used.

Thus, the present invention is well adapted to carry out the objects and attain the ends and advantages mentioned above as well as those inherent therein. While a preferred embodiment of the invention has been described for the purpose of this disclosure, numerous changes in the construction and arrangement of parts and the performance of steps can be made by those skilled in the art, which changes are encompassed within the spirit of this invention as defined by the appended claims.

What is claimed is:

1. A power supply comprising:
   first energy source means, having a first energy density, for providing a first current;
   second energy source means, having a second energy density greater than said first energy density, for providing a second current less than said first current; and
   connector means for conducting said second current to a connected load when the load does not require a current greater than said second current and for conducting said first current to a connected load when the load does require a current greater than said second current,
   wherein said first energy source means includes first battery means for providing said first current throughout a first temperature range encompassing temperatures above and below a predetermined temperature of said first temperature range; and said second energy source means includes second battery means for providing said second current throughout a second temperature range greater than said predetermined temperature.

2. A power supply as defined in claim 1, wherein:
   said first battery means includes means for providing, at temperatures below said predetermined temperature, a third current equal to said second current; and
   said connector means includes means for conducting said third current to a connected load when the load does not require a current greater than said second current and the temperature is below said predetermined temperature.

3. A power supply as defined in claim 1, wherein:
   said first energy source means has a first voltage; and
   said second energy source means has a second voltage variable between a magnitude greater than said first voltage and a magnitude less than said first voltage in response to the current required by a connected load.

4. A power supply as defined in claim 3, wherein:
   said first energy source means includes a first plurality of batteries connected in electrical series; and
   said second energy source means includes a second plurality of batteries connected in electrical series, said second plurality connected through said connector means in electrical parallel to said first plurality.

5. A power supply as defined in claim 4, wherein said connector means includes:
   first diode means for connecting said first plurality of batteries to a load; and
   second diode means for connecting said second plurality of batteries to said first diode means.

6. A power pack for enabling longer operating times of an electrical load which is to be used above ground and downhole in a well bore and to be energized by at least a minimum operating voltage and which is to draw different currents at different stages of operation, said power pack comprising:
   a first plurality of batteries connected so that a first open circuit voltage greater than the minimum operating voltage is provided under open circuit conditions;
   a second plurality of batteries connected so that a second open circuit voltage greater than said first open circuit voltage is provided under open circuit conditions; and
   switch means for switchably connecting a respective one of said first plurality of batteries and said second plurality of batteries in circuit with load in response to the current drawn by the load and the ambient temperature of said power pack when the load is connected to said switch means.

7. A power pack as defined in claim 6, wherein said switch means includes:
   first diode means for connecting said first plurality of batteries to the load; and
   second diode means for connecting said second plurality of batteries to the load.

8. A power pack as defined in claim 7, wherein each of said first and second diode means is characterized as a respective germanium diode.

9. A power pack as defined in claim 6, wherein:
   said batteries of said first plurality include zinc silver oxide; and
   said batteries of said second plurality include lithium.

10. A power pack as defined in claim 6, wherein:
    said batteries of said first plurality are connected in electrical series so that two terminals, between which said first open circuit voltage exists under open circuit conditions, are defined; and
    said batteries of said second plurality are connected in electrical series so that two terminals, between which said second open circuit voltage exists under open circuit conditions, are defined, one of said terminals of said second plurality of batteries connected to a corresponding one of said terminals of said first plurality of batteries and the respective other terminal of each of said first and second pluralities of batteries connectible to the load through said switch means.

11. A power pack as defined in claim 10, wherein said switch means includes:
    a first diode having a cathode and having an anode connected to said respective other terminal of said first plurality of batteries; and
    a second diode having a cathode connected to said cathode of said first diode and having an anode connected to said respective other terminal of said second plurality of batteries.

12. A power pack as defined in claim 6, wherein:
    said first plurality of batteries has a first energy density; and
    said second plurality of batteries has a second energy density greater than said first energy density.

13. A power pack as defined in claim 6, wherein:
    said first plurality of batteries provides a substantially stable voltage regardless of the current drawn by the load when the load is connected to said power pack; and
    said second plurality of batteries provides a voltage variable between a magnitude substantially equal to said second open circuit voltage and a magnitude less than said first open circuit voltage in response to the different currents drawn by the load at the different stages of operation when the load is connected to said power pack.

14. A method of energizing a load, operating within a range of temperatures, requiring one current during one time period and requiring another current during another time period, which one current is greater than the other current, said method comprising the steps of:
    (a) communicating to the load during the one time period a first energy source, having a first energy density, is operating above and below a predetermined temperature level included within said range of temperatures; and (b) communicating to the load during the other time period a second energy source, having a second energy density greater than said first energy density, is operating above said predetermined temperature level.

15. A method as defined in claim 14, wherein:

said step (a) includes defining said first energy source with a first plurality of batteries providing a first voltage; and said step (b) includes defining said second energy source with a second plurality of batteries providing a second voltage less than said first voltage during the one time period and greater than said first voltage during the other time period.

16. A method as defined in claim 15, wherein:

said step (a) further includes connecting a first diode between said first plurality of batteries and the load; and said step (b) further includes connecting a second diode between said second plurality of batteries and the load.

17. A method as defined in claim 14, wherein:

said step (a) includes defining said first energy source with a first plurality of batteries including zinc silver oxide; and said step (b) includes defining said second energy source with a second plurality of batteries including lithium.

18. A method as defined in claim 14, wherein:

said step (a) includes switching a first plurality of serially connected batteries through a first diode to the load during the one time period; and said step (b) includes switching a second plurality of serially connected batteries through a second diode to the load during the other time period.

* * * * *